No. 614,025. Patented Nov. 8, 1898.
G. L. PRATT.
BRUSH HOLDER FOR DYNAMO ELECTRIC MACHINES.
(Application filed June 2, 1898.)
(No Model.)
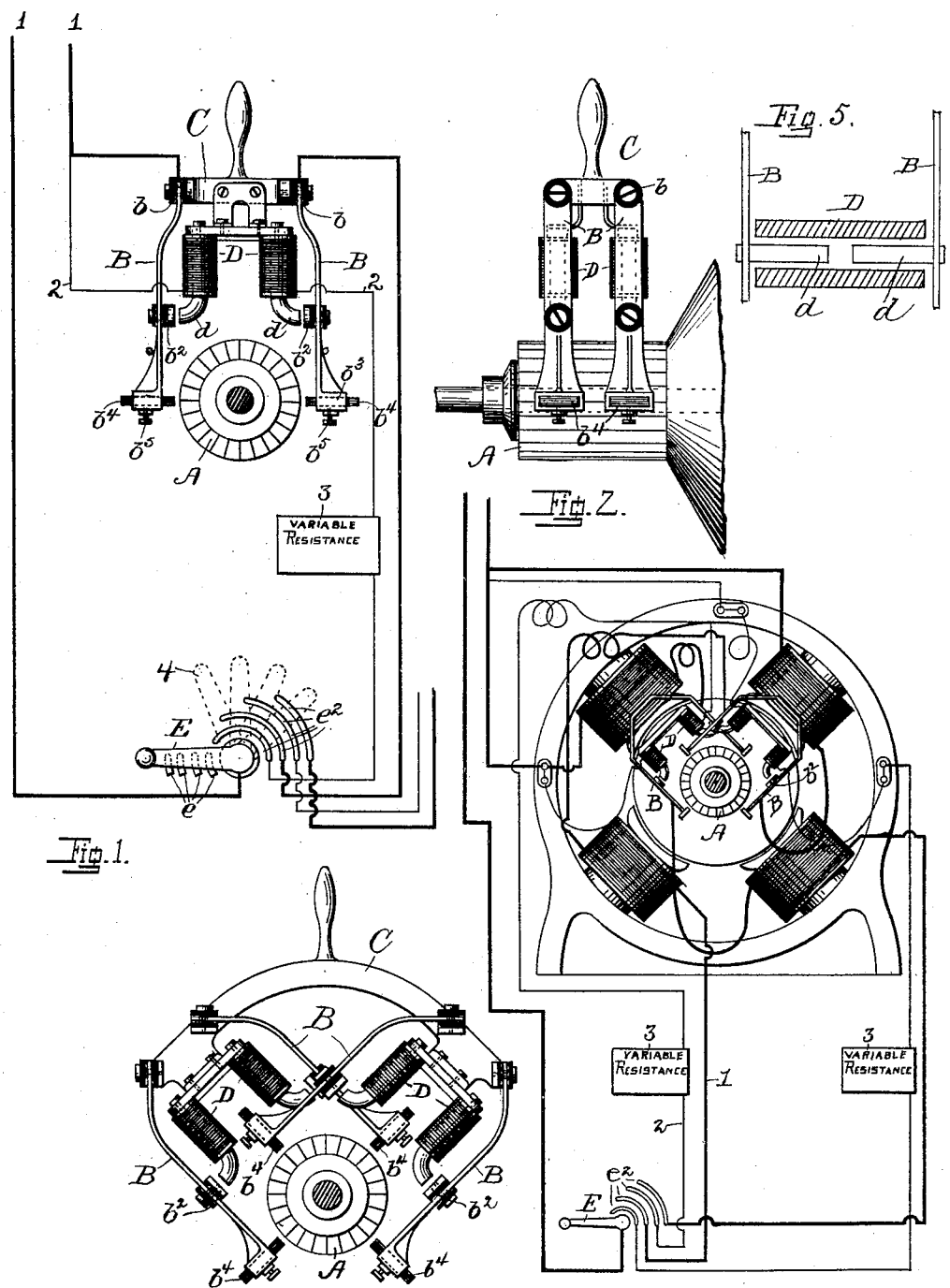
WITNESSES:
L. F. Hayden
R. M. Elliott
INVENTOR:
George L. Pratt,
BY
R. S. Dyrenforth
HIS ATTORNEY.
THE NORRIS PETERS CO., PHOTO-LITHO., WASHINGTON, D. C.

UNITED STATES PATENT OFFICE.

GEORGE L. PRATT, OF ATLANTA, GEORGIA.

BRUSH-HOLDER FOR DYNAMO-ELECTRIC MACHINES.

SPECIFICATION forming part of Letters Patent No. 614,025, dated November 8, 1898.

Application filed June 2, 1898. Serial No. 682,372. (No model.)

*To all whom it may concern:*

Be it known that I, GEORGE L. PRATT, a citizen of the United States, residing at Atlanta, in the county of Fulton and State of Georgia, have invented certain new and useful Improvements in Brush-Holders for Dynamo-Electric Machines and Motors; and I do hereby declare the following to be a full, clear, and exact description of the invention, such as will enable others skilled in the art to which it appertains to make and use the same.

This invention relates to brush-holders for dynamo-electric machines and motors.

The object of the invention is to present a brush-holder in which the brushes will contact with the commutator only at times when a motor or dynamo is doing actual work, whereby unnecessary wear of the brushes is obviated; furthermore, to present a brush-holder in which the degree of pressure or contact between the brushes and the commutator may be varied at will from the operator's stand; furthermore, to present a brush-holder in which when the current to the motor or dynamo is cut out the brushes will automatically be drawn out of contact with the commutator and when the circuit is again cut in will be automatically drawn back into engagement with the commutator, as before; furthermore, to present means by which one pair or more than one pair of brushes may be brought into contact with the commutator, each pair acting with a corresponding field-magnet to increase the power of the motor by thus changing it from a two-pole to a four or more pole motor.

With these objects in view the invention consists, broadly, in a brush-holder the brushes of which when the current to the motor is cut out will be out of contact with the commutator and which when the current is supplied to the motor will be automatically brought into engagement with the commutator, the force of contact between the brushes and the commutator being increased or diminished through the variable resistance.

The invention consists, further, in the combination, with a commutator, of a brush-holder comprising spring brush-carriers adapted normally to hold the brushes out of contact with the commutator and electromagnets adapted when the current is passing through the motor or dynamo to exert attraction in a direction opposed to the springs, whereby the latter are drawn toward the commutator to bring the brushes into contact therewith.

The invention consists, finally, in the various novel details of construction and novel arrangement of parts of a brush-holder, as will be hereinafter fully described and claimed.

In the accompanying drawings, forming a part of this specification and in which like letters and figures of reference indicate corresponding parts, Figure 1 is a view in the nature of a diagram, the commutator, brush-holder, and electromagnets for operating the same being shown in elevation and the circuits in plan. Fig. 2 is a view in side elevation, showing a brush-holder in which two brushes are employed on one side of the commutator, a like number being employed on the opposite side, but not appearing herein, as they are hid from view by those parts appearing in full lines. Fig. 3 is a view in cross-section, showing the idea applied to two sets of brushes at right angles to each other. Fig. 4 is a view in end elevation, partly in section, showing the application of the invention to a four-pole motor and the electric connections with the controller and resistance; and Fig. 5 is a detail view showing the brushes operated by solenoid-magnets.

Referring to the drawings and to Fig. 1 thereof, 1 1 designate the mains for supplying current to the motor, and 2 2 the circuit for supplying current to the magnet-coils, the latter circuit including a variable resistance 3, the function of which will appear farther on. The magnets and magnet-coils must not be in metallic connection with the brushes; nor does the current to the magnet-coils reach the brushes or any other part of the machine.

The commutator A may be that of a motor or a dynamo and is supplied from the mains 1 1 through spring brush-carrying arms B, the same being suitably secured to the brush-yoke C and insulated therefrom by suitable insulating blocks or disks $b$. Each of these springs carries an armature $b^2$, suitably insulated from the spring, and at its lower end is provided with a head $b^3$, having a transverse recess in which is set the brush $b^4$, the latter being held in position therein by a set-screw $b^5$. The springs B are flexed to cause the brushes normally or when no current is passing to the commutator to be out of contact with the commutator, so that when the current is cut off from the motor, as in the case of a car running downhill or when stopping the car, the brushes will be free from contact with the commutator, and thereby avoid unnecessary wear. To cause the brushes to contact with the commutator, two electromagnets D are employed, the cores $d$ of which are in this instance slightly curved outward, so as to bring the end of the core parallel with the face of the armature $b^2$, so that when the current is passing to the motor through the mains 1 1 the current through the circuit 2 will at the same time pass through the electromagnets, and thereby energize the same and cause their cores to attract the armatures $b^2$ of the springs B, and thus bring the brushes into contact with the commutator. Should it be desired to increase the power of the electromagnets, the same may be supplied with another winding in series with the motor, and as this arrangement is obvious illustration thereof is deemed unnecessary.

To increase or diminish the supply of current to the motor and at the same time the intensity of the current through the circuit 2 to the electromagnets D, a controller is employed, the same comprising, as usual, an arm E, carrying a series of contact-points $e$, adapted, successively, to be brought into engagement with the contact-plates $e^2$, to which the successive terminals of the mains and circuit 2 are attached. When the controller-arm E is thrown to cut in the circuit to the motor, the current to the electromagnets is cut in first or in advance of the current to the brushes, so that the electromagnets D will first be energized to cause the brushes to contact with the commutator, and thus be in position for effective service before the circuit to the motor is cut in, thus preventing sparking and consequent damage. Initial current through the circuit 2 and through the variable resistance 3 will be sufficient to cause the brushes to contact with the commutator by a current of moderate energy passing through the commutator; but should the full strength of the current be cut into the motor the current through the circuit 2 will progressively increase in strength, so as to compensate for the increase of strength of current to the commutator, and thereby avoid sparking or other loss of energy. As shown in Fig. 1, the brush-carrying springs B are each provided with a single brush; but it is to be understood that, if preferred, two springs may be provided on each side of the commutator, as shown in Fig. 2.

When it is desired to have two pairs of brushes arranged at right angles to each other, the arrangement shown in Fig. 3 will be adopted, which in operation is exactly the same as that shown in Fig. 1 and therefore needs no detailed description.

The brush-holder yoke C, which is provided with brush-holding springs and electromagnets for operating the same, is supported by the frame of the motor in such manner that it may be moved in a circle the center of which is coincident with the center of the armature-shaft and may be provided with a clamp or other device to secure it in any desired position. This same principle may be applied to any number of pairs of brushes on the same or different commutators on the same or different motors, and the connections with the controller may be so arranged that any desired number of pairs of brushes may be brought into contact with the commutator or commutators, thus allowing a very wide variation in the power of the motor or motors at the will of the operator without the use of any dead or other expensive resistances. The magnets D for bringing the brushes into contact may be connected up in shunt, or in parallel, or in multiple, or in series, or series parallel, or series multiple, or in any other arrangement with either the armature or the field of the motor or motors on which they are located.

The operation is as follows: When the motor is at rest, the circuit 1 remains open until the brushes are brought into contact with the commutator by the action of the magnets D, as described, upon the armatures $b^2$ of the springs B, which action is accomplished by the closing of the circuit 2 by the controller E and the passage of the current through the coils of the magnets D. The circuit 2, as before stated, is supplied with the variable resistance 3 in order that the strength of the magnets, and consequently the pressure of the brushes on the commutator, may be controlled by the operator from his stand at the controller. While the electromagnets D are herein shown as of the type employing fixed cores, it is to be understood that a solenoid-magnet may be employed, as shown in Fig. 5, to effect movement of the brushes against the commutator. As shown in this figure, the cores are straight; but they may be curved to prevent binding. The circuit 2, the members of which are in effect the terminals of the coils of the magnet D, is connected with the controller in such manner that as soon as the current is applied to the motor or machine and the operator or motor-man moves the handle-bar of the controller to the position indicated by 4 the circuit 2 is closed, the brushes are brought into contact with the commutator, and so remain in contact until the current is shut off, at which time the brushes are raised or moved out of contact with the commutator by the reaction of the springs B. In the embodiment of the invention illustrated the magnets are made to hold the brushes in contact with the commutator and the reaction of the springs to release it; but it is obvious that this arrangement may be reversed—that is to say, the springs may be made normally to hold the brushes in contact with the commutator and the magnets to hold them out of contact. The construction here exhibited shows the application of the principle to one pair of brushes only; but each individual brush-holder may have its own magnet or the same magnet may be made to act on two or more brush-holders. The form of the magnets may be varied to suit the condition of any form of brush-holder for either copper, carbon, or other forms of brush.

In Fig. 4 I have shown the application of the invention to a motor having four polar projections, this for the purpose of displaying its adaptability to any form of motor or dynamo. As the operation of the parts are the same as already explained, further description is deemed unnecessary.

Having thus fully described my invention, what I claim as new, and desire to secure by Letters Patent of the United States, is—

1. The combination with a dynamo-electric machine, or motor, of a brush-holder, and means operating automatically, when the current is cut in, to cause the brushes to move into engagement with the commutator, and means operating automatically, when the current is cut out, to move the brushes out of engagement with the commutator.

2. In a dynamo-electric machine, or motor, the combination with the brush-holders, of electromagnets operating to cause the brushes automatically to engage with the commutator only during the period of passage of current, and springs for moving and holding the brushes out of contact with the commutator when the passage of current is broken, substantially as described.

3. In a dynamo-electric machine, or motor, the combination with a yoke, of electromagnets and insulated brush-holders carrying insulated armatures arranged adjacent to the cores of the electromagnets, the arrangement of the yoke being such that the position of the brushes may be changed on the commutator without changing their position with relation to each other, substantially as described.

4. In a dynamo-electric machine, or motor, the combination with the brushes, and electromagnets operating to cause the brushes automatically to engage the commutator, of springs, constituting the brush-holders, flexed to oppose the action of the electromagnets, and insulated armatures carried by the springs, substantially as described.

5. In a dynamo-electric machine, or motor, the combination with the brushes, and electromagnets operating to cause the brushes automatically to engage the commutator, of springs, constituting the brush-holders, flexed to oppose the action of the electromagnets, insulated armatures carried by the springs, a controller, circuit connections between the brush-holders and the controller, and a variable resistance included in the circuit, substantially as described.

6. In a dynamo-electric machine, or motor, the combination with a movable yoke, of springs, constituting brush-holders, flexed to hold the brushes normally out of contact with the commutator, the brushes being disposed in diametric alinement, electromagnets also carried by the yoke, armatures carried by the brush-holders in alinement with the cores of the electromagnets, and means for energizing the electromagnets to attract the said armatures of the brush-holders, and thus bring the brushes into contact with the commutator, substantially as described.

7. In a dynamo-electric machine, or motor, the combination with one or more electromagnets to regulate and control the contact of the brushes with the commutator, a movable brush-holding yoke to change the position of the brushes with relation to the commutator, a variable resistance included in the circuit, and a controller to govern the operation of the brush-magnets, substantially as described.

8. The method of preventing unnecessary wear between the parts of a current-collecting device, which consists, first, in automatically making contact during the transmission of current, and, secondly, automatically breaking the contact when the current is cut off, substantially as described.

9. The method of increasing the power of a motor by changing it from a motor having two polar projections to a motor having four or more polar projections, which consists in bringing separate pairs of brushes into contact with the commutator, each pair of brushes acting in conjunction with corresponding field-magnets, substantially as described.

In testimony whereof I affix my signature in the presence of two witnesses.

GEO. L. PRATT.

Witnesses:
GILBERT H. BOGGS,
J. EUGENE LOWRY.